United States Patent
Liu et al.

(10) Patent No.: US 11,700,155 B2
(45) Date of Patent: Jul. 11, 2023

(54) RECEIVING CIRCUIT OF DESERIALIZER

(71) Applicant: REALTEK SEMICONDUCTOR CORPORATION, Hsinchu (TW)

(72) Inventors: Yi-Ting Liu, Hsinchu (TW); Jian Liu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 27 days.

(21) Appl. No.: 17/571,560

(22) Filed: Jan. 10, 2022

(65) Prior Publication Data

US 2022/0231892 A1      Jul. 21, 2022

(30) Foreign Application Priority Data

Jan. 18, 2021   (CN) .......................... 202110063735.9

(51) Int. Cl.
*H04L 25/03*    (2006.01)
*H04B 1/16*     (2006.01)
*H04L 25/02*    (2006.01)

(52) U.S. Cl.
CPC ......... *H04L 25/03878* (2013.01); *H04B 1/16* (2013.01); *H04L 25/0292* (2013.01)

(58) Field of Classification Search
CPC . H04L 25/03878; H04L 25/0292; H04B 1/16; H03M 9/00
See application file for complete search history.

(56) References Cited

U.S. PATENT DOCUMENTS 9,338,040 B2    5/2016  Longo et al.
9,432,007 B1 *  8/2016  Gong .................. H03K 5/1252
(Continued)

FOREIGN PATENT DOCUMENTS

EP        2390755 A1 * 11/2011  ........... G06F 1/3203

OTHER PUBLICATIONS

OA letter of the counterpart TW application (appl. No. 110107777) dated Feb. 18, 2022. Summary of the OA letter: (1) Claim(s) 1 and 8 is/are rejected under Patent Law Article 22(2) as being unpatentable over reference 1 (U.S. Pat. No. 9338040 B2).) Claim correspondence between the TW counterpart application and the instant US application: Claims 1-10 in the TW counterpart application correspond to claims 1, 2, 4, 6, 7, 9, 11, 12, 14, and 15 in the instant US application, respectively.

*Primary Examiner* — Jean B Corrielus
(74) *Attorney, Agent, or Firm* — WPAT, P.C (57) ABSTRACT

A receiving circuit of a deserializer is provided. The receiving circuit of the deserializer receives an input signal and includes: a signal receiving terminal for receiving the input signal; a link equalizer circuit (LEQ) having a first input terminal coupled to the signal receiving terminal; and an out-of-band signaling (OOBS) circuit having a second input terminal coupled to the signal receiving terminal; a first resistor coupled between the signal receiving terminal and a first reference voltage; and a second resistor coupled between the signal receiving terminal and a second reference voltage; and a buffer circuit having a third input terminal and an output terminal, wherein the third input terminal receives a voltage, and the output terminal is coupled to the LEQ or the OOBS circuit. The first input terminal of the LEQ and the second input terminal of the OOBS circuit are not electrically coupled, and the voltage is adjustable.

16 Claims, 10 Drawing Sheets

(56) References Cited

U.S. PATENT DOCUMENTS

| | | | |
|---|---|---|---|
| 2009/0300562 A1* | 12/2009 | Xu | G06F 13/4295 |
| | | | 716/111 |
| 2010/0127734 A1* | 5/2010 | Cheung | H03K 5/2481 |
| | | | 327/77 |
| 2017/0093525 A1* | 3/2017 | Navid | H04L 1/0036 |

* cited by examiner

RECEIVING CIRCUIT OF DESERIALIZER

BACKGROUND OF THE INVENTION

1. Field of the Invention

The present invention generally relates to a signal transmission circuit, and, more particularly, to a circuit at the receiving end of a serializer/deserializer (SerDes).

2. Description of Related Art

Link equalizer circuits (LEQs) and out-of-band signaling (OOBS) circuits are commonly found at the receiving end of the SerDes. The LEQ equalizes the signals received at the receiving end to compensate for the high-frequency attenuation of the signals as much as possible. The OOBS circuit detects the amplitude of the signals and controls the power of the signals. The detailed circuits and operating principles of the LEQs and the OOBS circuits are well known to people having ordinary skill in the art; therefore, the details are omitted for brevity.

However, because the common mode voltage in the receiving end of the traditional SerDes is jointly established by resistor-based voltage division, the LEQ, and the OOBS circuit, load stacking that accounts for high speed data attenuation is a common issue. Therefore, the design of the receiving circuit of a high-efficiency SerDes is a big challenge in the design of high-speed circuits.

SUMMARY OF THE INVENTION

In view of the issues of the prior art, an object of the present invention is to provide a receiving circuit of a deserializer, so as to make an improvement to the prior art.

According to one aspect of the present invention, a receiving circuit of a deserializer is provided. The receiving circuit of the deserializer receives an input signal and includes a signal receiving terminal, a link equalizer circuit, an out-of-band signaling (OOBS) circuit, a first resistor, a second resistor, and a buffer circuit. The signal receiving terminal is configured to receive the input signal. The link equalizer circuit has a first input terminal coupled to the signal receiving terminal. The OOBS circuit has a second input terminal coupled to the signal receiving terminal. The first resistor is coupled between the signal receiving terminal and a first reference voltage. The second resistor is coupled between the signal receiving terminal and a second reference voltage. The buffer circuit has a third input terminal and an output terminal. The third input terminal is configured to receive a voltage, and the output terminal is coupled to the link equalizer circuit or the OOBS circuit. The first input terminal of the link equalizer circuit and the second input terminal of the OOBS circuit are not electrically coupled, and the voltage is adjustable.

According to another aspect of the present invention, a receiving circuit of a deserializer is provided. The receiving circuit of the deserializer receives an input signal and includes a signal receiving terminal, a link equalizer circuit, an out-of-band signaling (OOBS) circuit, a first capacitor, a second capacitor, a first resistor, a second resistor, and a buffer circuit. The signal receiving terminal is configured to receive the input signal. The link equalizer circuit has a first input terminal coupled to the signal receiving terminal. The OOBS circuit has a second input terminal coupled to the signal receiving terminal. The first capacitor has a first terminal and a second terminal. The first terminal is coupled to the signal receiving terminal, and the second terminal is coupled to the link equalizer circuit or the OOBS circuit. The second capacitor has a third terminal and a fourth terminal. The third terminal is coupled to the signal receiving terminal, and the fourth terminal is coupled to the link equalizer circuit or the OOBS circuit. The first resistor has a fifth terminal and a sixth terminal. The fifth terminal is coupled to a first reference voltage, and the sixth terminal is electrically coupled to the signal receiving terminal. The second resistor has a seventh terminal and an eighth terminal. The seventh terminal is coupled to a second reference voltage, and the eighth terminal is electrically coupled to the link equalizer circuit or the OOBS circuit. The buffer circuit has a third input terminal and an output terminal. The third input terminal is configured to receive a voltage, and the output terminal is coupled to the link equalizer circuit or the OOBS circuit. The first input terminal of the link equalizer circuit and the second input terminal of the OOBS circuit are not electrically coupled, and the voltage is adjustable.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes the receiving circuit of a deserializer. On account of that some or all elements of the receiving circuit of the deserializer could be known, the detail of such elements is omitted provided that such detail has little to do with the features of this disclosure, and that this omission nowhere dissatisfies the specification and enablement requirements. A person having ordinary skill in the art can choose components equivalent to those described in this specification to carry out the present invention, which means that the scope of this invention is not limited to the embodiments in the specification.

Figure 1:
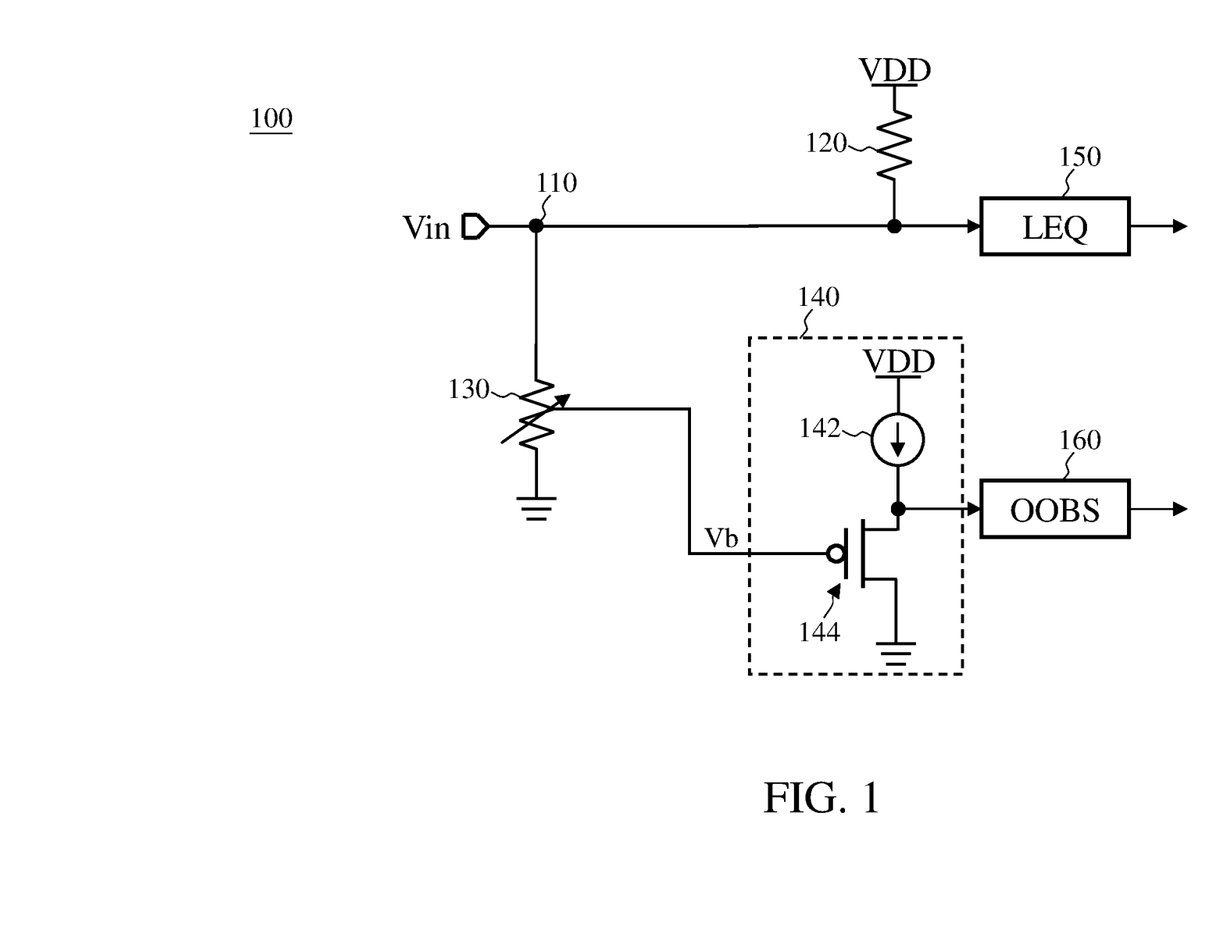
FIG. 1 is a circuit diagram of the receiving circuit of a deserializer according to an embodiment of the present invention.

FIG. 1 is a circuit diagram of the receiving circuit of a deserializer according to an embodiment of the present invention. The receiving circuit 100 includes a signal receiving terminal 110, a resistor 120, a resistor 130, a buffer circuit 140, an LEQ 150, and an OOBS circuit 160. The receiving circuit 100 is a receiving circuit of the direct current (DC) coupling mode.

The input signal Vin is inputted into the receiving circuit 100 through the signal receiving terminal 110 (i.e., the signal receiving terminal 110 receives the input signal Vin). The resistor 120 is coupled between the first reference voltage (e.g., the power supply voltage VDD) and the signal receiving terminal 110. The resistor 130 is a variable resistor, and is coupled between the signal receiving terminal 110 and the second reference voltage (e.g., ground). The LEQ 150 is electrically connected to the signal receiving terminal 110; in other words, the resistor 120 is coupled between the first reference voltage and the input terminal of the LEQ 150, and the resistor 130 is coupled between the input terminal of the LEQ 150 and the second reference voltage. The buffer circuit 140 is coupled between the resistor 130 and the OOBS circuit 160; more specifically, the input terminal of the buffer circuit 140 is electrically connected to the resistor 130, and the output terminal of the buffer circuit 140 is electrically connected to the input terminal of the OOBS circuit 160.

The input terminal of the buffer circuit 140 receives the voltage Vb which is the divided voltage on the resistor 130. In other words, the voltage Vb can be changed by adjusting the resistance of the resistor 130. Adjusting the voltage Vb is equivalent to adjusting the common mode voltage of the OOBS circuit 160.

In some embodiments, the voltage Vb is smaller than the voltage at the input terminal of the LEQ 150.

In the embodiment of FIG. 1, the buffer circuit 140 is embodied by a P-channel Metal-Oxide-Semiconductor Field-Effect Transistor (MOSFET) (hereinafter referred to as a PMOS transistor) source follower circuit (which is also referred to as a common-drain amplifier). The buffer circuit 140 includes a current source 142 and a PMOS transistor 144. The gate of the PMOS transistor 144 (i.e., the input terminal of the buffer circuit 140) receives the voltage Vb, the source of the PMOS transistor 144 (i.e., the output terminal of the buffer circuit 140) is coupled to the first reference voltage through the current source 142, and the drain of the PMOS transistor 144 is electrically connected to the second reference voltage. The operating principle of the source follower circuit is well-known to people having ordinary skill in the art, and is thus omitted for brevity.

One of the purposes of the buffer circuit 140 is to separate the LEQ 150 and the OOBS circuit 160 in a way that the input terminal of the LEQ 150 and the input terminal of the OOBS circuit 160 are not electrically connected to each other. As a result, the common mode voltage of the LEQ 150 and the common mode voltage of the OOBS circuit 160 can be adjusted independently.

Another purpose of the buffer circuit 140 is to reduce the load observed by the OOBS circuit 160; therefore, the data transmission rate of the receiving circuit 100 can be improved.

Figure 2:
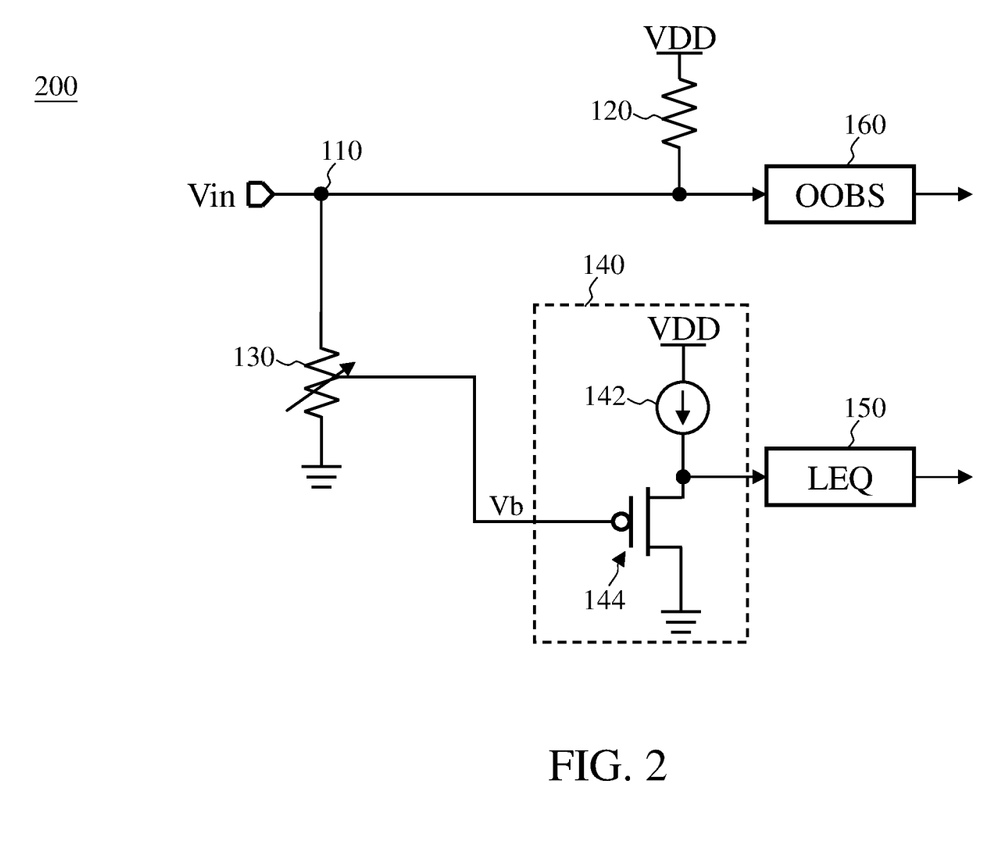
FIG. 2 is a circuit diagram of the receiving circuit of a deserializer according to another embodiment of the present invention.

FIG. 2 is a circuit diagram of the receiving circuit of the deserializer according to another embodiment of the present invention. The receiving circuit 200 is similar to the receiving circuit 100, except that the LEQ 150 and the OOBS circuit 160 are interchanged. The receiving circuit 200 is a receiving circuit of the DC coupling mode. In the embodiment of FIG. 2, the buffer circuit 140 can reduce the load observed by the LEQ 150; in addition, the common mode voltage of the LEQ 150 and the common mode voltage of the OOBS circuit 160 can be adjusted independently. Adjusting the voltage Vb is equivalent to adjusting the common mode voltage of the LEQ 150.

In some embodiments, the voltage Vb is smaller than the voltage at the input terminal of the OOBS circuit 160.

Figure 3:
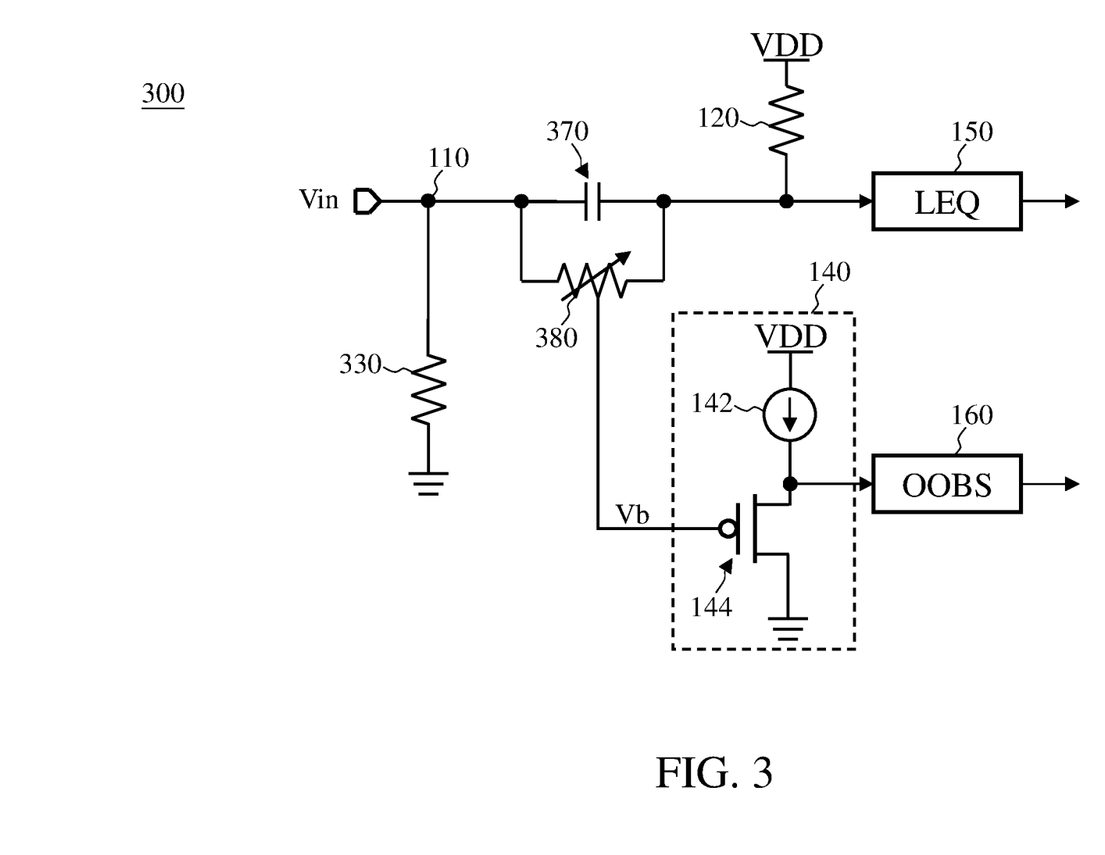
FIG. 3 is a circuit diagram of the receiving circuit of a deserializer according to another embodiment of the present invention.

FIG. 3 is a circuit diagram of the receiving circuit of the deserializer according to another embodiment of the present invention. The receiving circuit 300 includes a signal receiving terminal 110, the resistor 120, a resistor 330, the buffer circuit 140, the LEQ 150, the OOBS circuit 160, a capacitor 370, and a resistor 380. The receiving circuit 300 is a receiving circuit of the DC coupling mode. The receiving circuit 300 is similar to the receiving circuit 100, except that the receiving circuit 300 further includes the capacitor 370 and the resistor 380. The resistor 380 is a variable resistor. The function of the resistor 330 is the same as that of the resistor 130, but the resistor 330 may not be a variable resistor.

The capacitor 370 is coupled between the signal receiving terminal 110 and the LEQ 150. More specifically, one end of the capacitor 370 is electrically connected to the signal receiving terminal 110, and the other end of the capacitor 370 is electrically connected to the input terminal of the LEQ 150. The resistor 380 and the capacitor 370 are connected in parallel. The input terminal of the buffer circuit 140 is electrically connected to the resistor 380. One of the purposes of the capacitor 370 and the resistor 380 is to generate a peak gain at the high-frequency part of the input signal Vin, so as to compensate for the high-frequency loss of the input signal Vin.

The input terminal of the buffer circuit 140 receives the voltage Vb which is the divided voltage on the resistor 380. In other words, the voltage Vb can be changed by adjusting the resistance of the resistor 380.

In some embodiments, the voltage Vb is smaller than the voltage at the input terminal of the LEQ 150.

Figure 4:
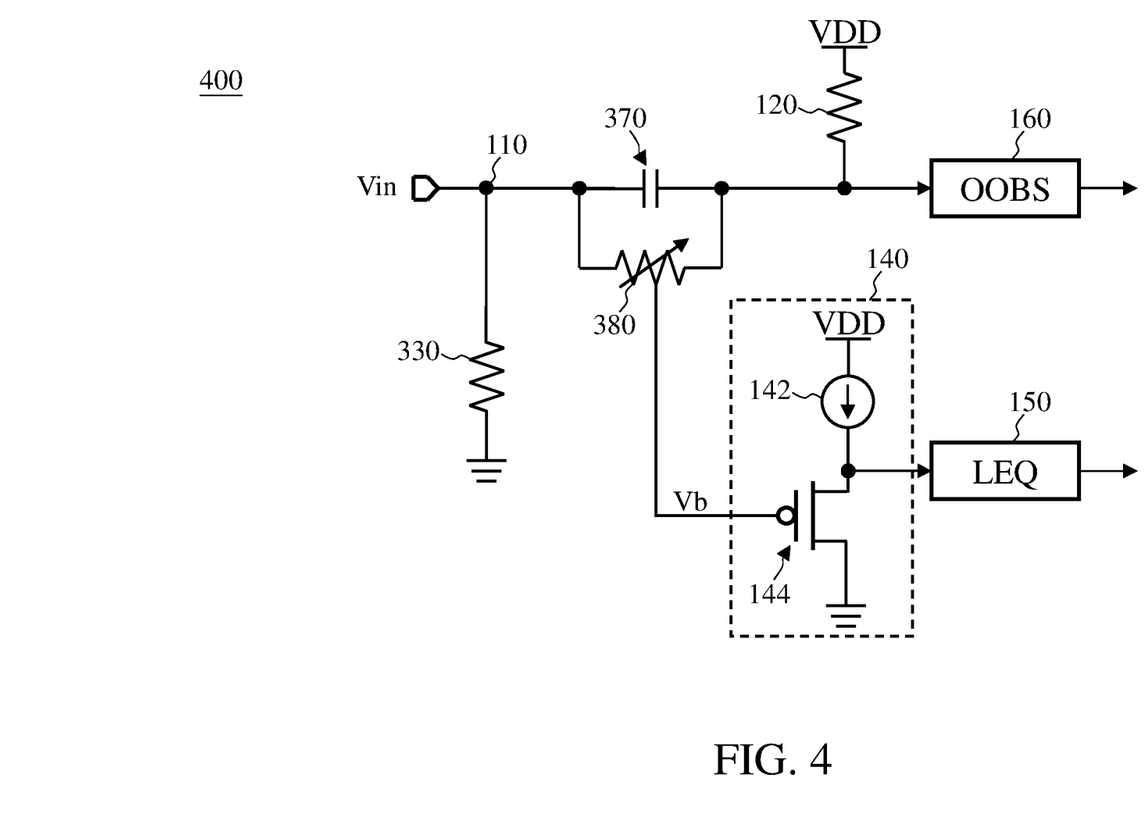
FIG. 4 is a circuit diagram of the receiving circuit of a deserializer according to another embodiment of the present invention.

FIG. 4 is a circuit diagram of the receiving circuit of the deserializer according to another embodiment of the present invention. The receiving circuit 400 is similar to the receiving circuit 300, except that the LEQ 150 and the OOBS circuit 160 are interchanged. The receiving circuit 400 is a receiving circuit of the DC coupling mode. In the embodiment of FIG. 4, the buffer circuit 140 can reduce the load observed by the LEQ 150; in addition, the common mode voltage of the LEQ 150 and the common mode voltage of the OOBS circuit 160 can be adjusted independently.

In some embodiments, the voltage Vb is smaller than the voltage at the input terminal of the OOBS circuit 160.

Figure 5:
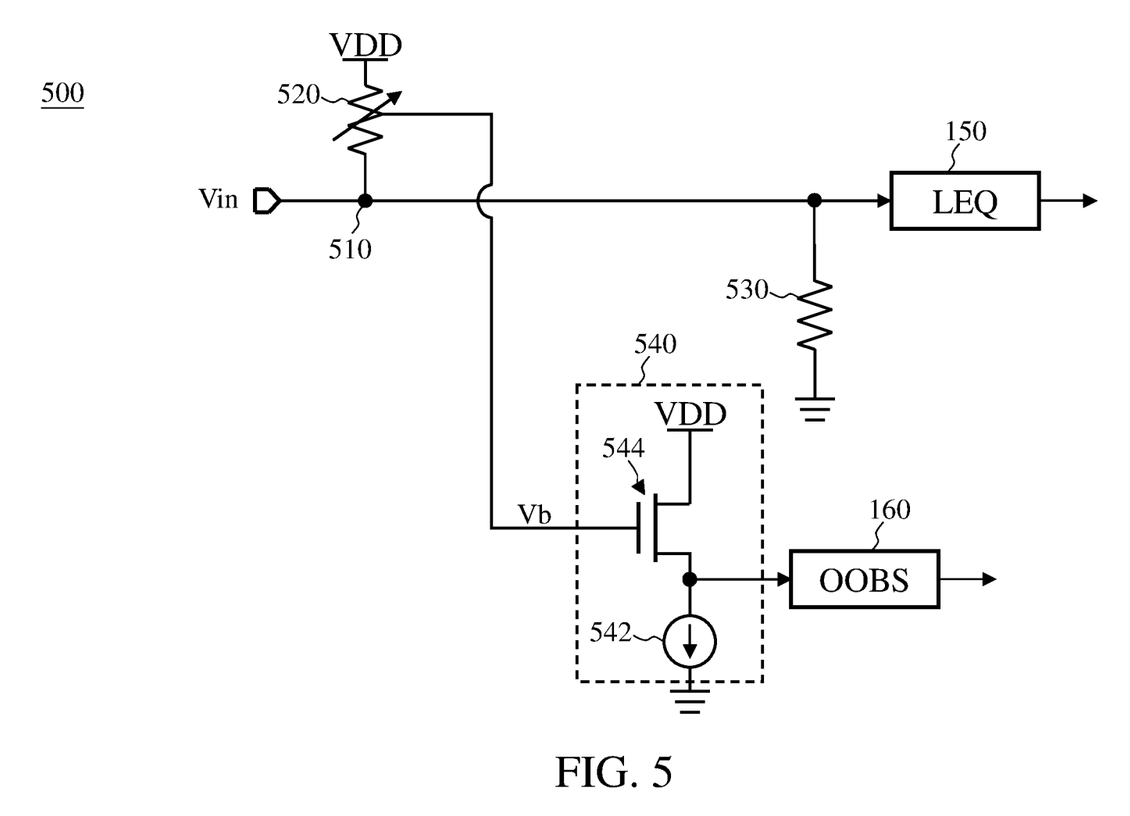
FIG. 5 is a circuit diagram of the receiving circuit of a deserializer according to another embodiment of the present invention.

FIG. 5 is a circuit diagram of the receiving circuit of the deserializer according to another embodiment of the present invention. The receiving circuit 500 includes a signal receiving terminal 510, a resistor 520, a resistor 530, a buffer circuit 540, the LEQ 150, and the OOBS circuit 160. The receiving circuit 500 is a receiving circuit of the DC coupling mode.

The input signal Vin is inputted into the receiving circuit 500 through the signal receiving terminal 510 (i.e., the signal receiving terminal 510 receives the input signal Vin). The resistor 520 is a variable resistor, and is coupled between the first reference voltage and the signal receiving terminal 510. The resistor 530 is coupled between the signal receiving terminal 510 and the second reference voltage. The LEQ 150 is electrically connected to the signal receiving terminal 510; in other words, the resistor 520 is coupled between the first reference voltage and the input terminal of the LEQ 150, and the resistor 530 is coupled between the input terminal of the LEQ 150 and the second reference voltage. The buffer circuit 540 is coupled between the resistor 520 and the OOBS circuit 160; more specifically, the input terminal of the buffer circuit 540 is electrically connected to the resistor 520, and the output terminal of the buffer circuit 540 is electrically connected to the input terminal of the OOBS circuit 160.

The input terminal of the buffer circuit 540 receives the voltage Vb which is the divided voltage on the resistor 520. In other words, the voltage Vb can be changed by adjusting the resistance of the resistor 520. Adjusting the voltage Vb is equivalent to adjusting the common mode voltage of the OOBS circuit 160.

In some embodiments, the voltage Vb is greater than the voltage at the input terminal of the LEQ 150.

In the embodiment of FIG. 5, the buffer circuit 540 is embodied by an N-channel MOSFET (hereinafter referred to as an NMOS transistor) source follower circuit. The buffer circuit 540 includes a current source 542 and an NMOS transistor 544. The gate of the NMOS transistor 544 (i.e., the input terminal of the buffer circuit 540) receives the voltage Vb, the source of the NMOS transistor 544 (i.e., the output terminal of the buffer circuit 540) is coupled to the second reference voltage through the current source 542, and the drain of the NMOS transistor 544 is electrically connected to the first reference voltage. The operating principle of the source follower circuit is well-known to people having ordinary skill in the art, and is thus omitted for brevity.

The purpose of the buffer circuit 540 is similar to that of the buffer circuit 140, so the details are omitted for brevity.

Figure 6:
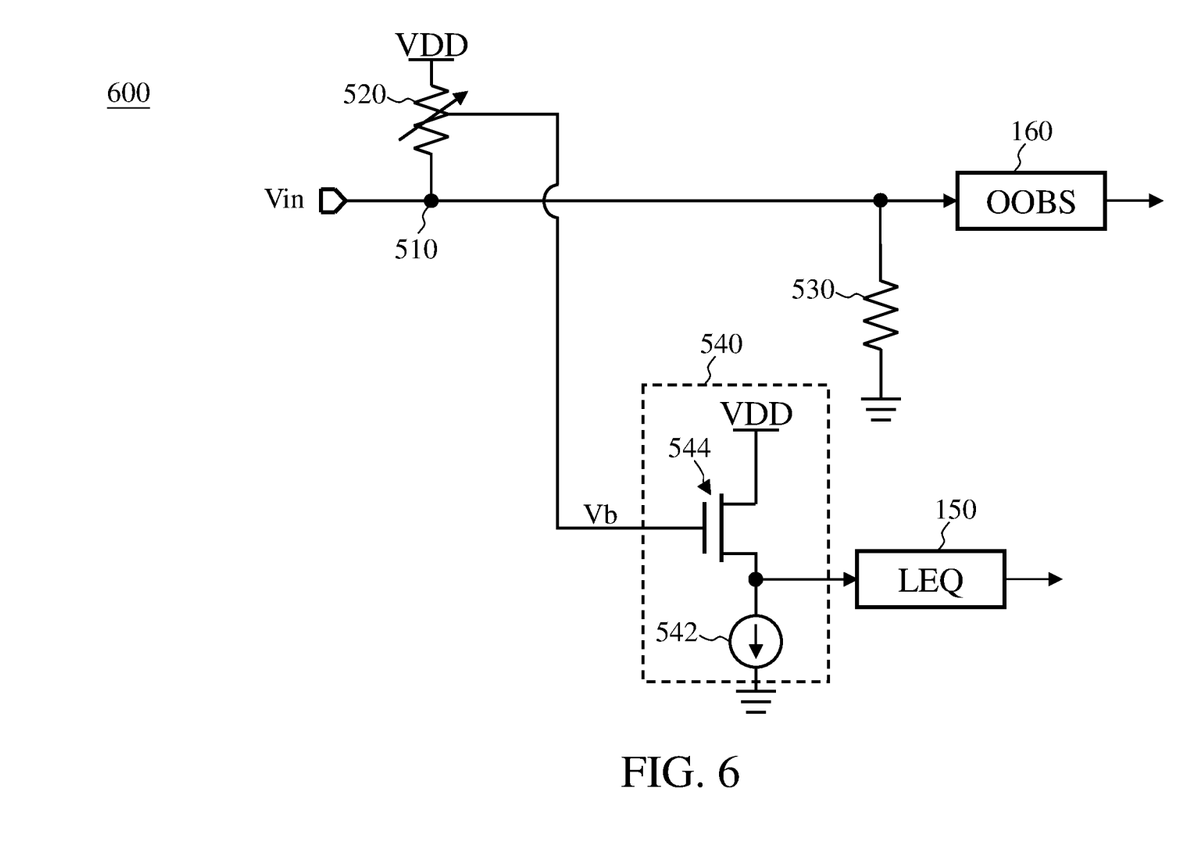
FIG. 6 is a circuit diagram of the receiving circuit of a deserializer according to another embodiment of the present invention.

FIG. 6 is a circuit diagram of the receiving circuit of the deserializer according to another embodiment of the present invention. The receiving circuit 600 is similar to the receiving circuit 500, except that the LEQ 150 and the OOBS circuit 160 are interchanged. The receiving circuit 600 is a receiving circuit of the DC coupling mode. In the embodiment of FIG. 6, the buffer circuit 540 can reduce the load observed by the LEQ 150; in addition, the common mode voltage of the LEQ 150 and the common mode voltage of the OOBS circuit 160 can be adjusted independently. Adjusting the voltage Vb is equivalent to adjusting the common mode voltage of the LEQ 150.

In some embodiments, the voltage Vb is greater than the voltage at the input terminal of the OOBS circuit 160.

Figure 7:
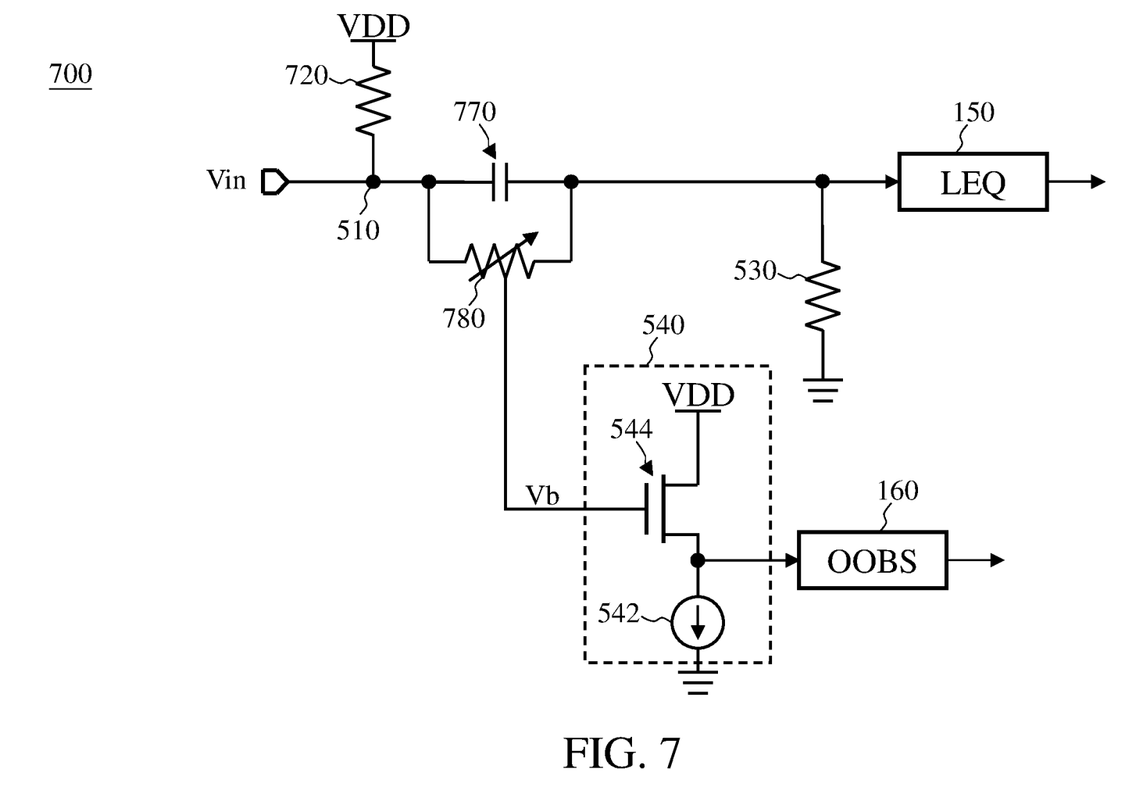
FIG. 7 is a circuit diagram of the receiving circuit of a deserializer according to another embodiment of the present invention.

FIG. 7 is a circuit diagram of the receiving circuit of the deserializer according to another embodiment of the present invention. The receiving circuit 700 includes a signal receiving terminal 510, a resistor 720, the resistor 530, the buffer circuit 540, the LEQ 150, the OOBS circuit 160, a capacitor 770, and a resistor 780. The receiving circuit 700 is a receiving circuit of the DC coupling mode. The receiving circuit 700 is similar to the receiving circuit 500, except that the receiving circuit 700 further includes the capacitor 770 and the resistor 780. The resistor 780 is a variable resistor. The function of the resistor 720 is the same as that of the resistor 520, but the resistor 720 may not be a variable resistor.

The capacitor 770 is coupled between the signal receiving terminal 510 and the LEQ 150. More specifically, one end of the capacitor 770 is electrically connected to the signal receiving terminal 510, and the other end of the capacitor 770 is electrically connected to the input terminal of the LEQ 150. The resistor 780 is connected in parallel with the capacitor 770. The input terminal of the buffer circuit 540 is electrically connected to the resistor 780. One of the purposes of the capacitor 770 and the resistor 780 is to generate a peak gain at the high-frequency part of the input signal Vin, so as to compensate for the high-frequency loss of the input signal Vin.

The input terminal of the buffer circuit 540 receives the voltage Vb which is the divided voltage on the resistor 780. In other words, the voltage Vb can be changed by adjusting the resistance of the resistor 780.

In some embodiments, the voltage Vb is greater than the voltage at the input terminal of the LEQ 150.

Figure 8:
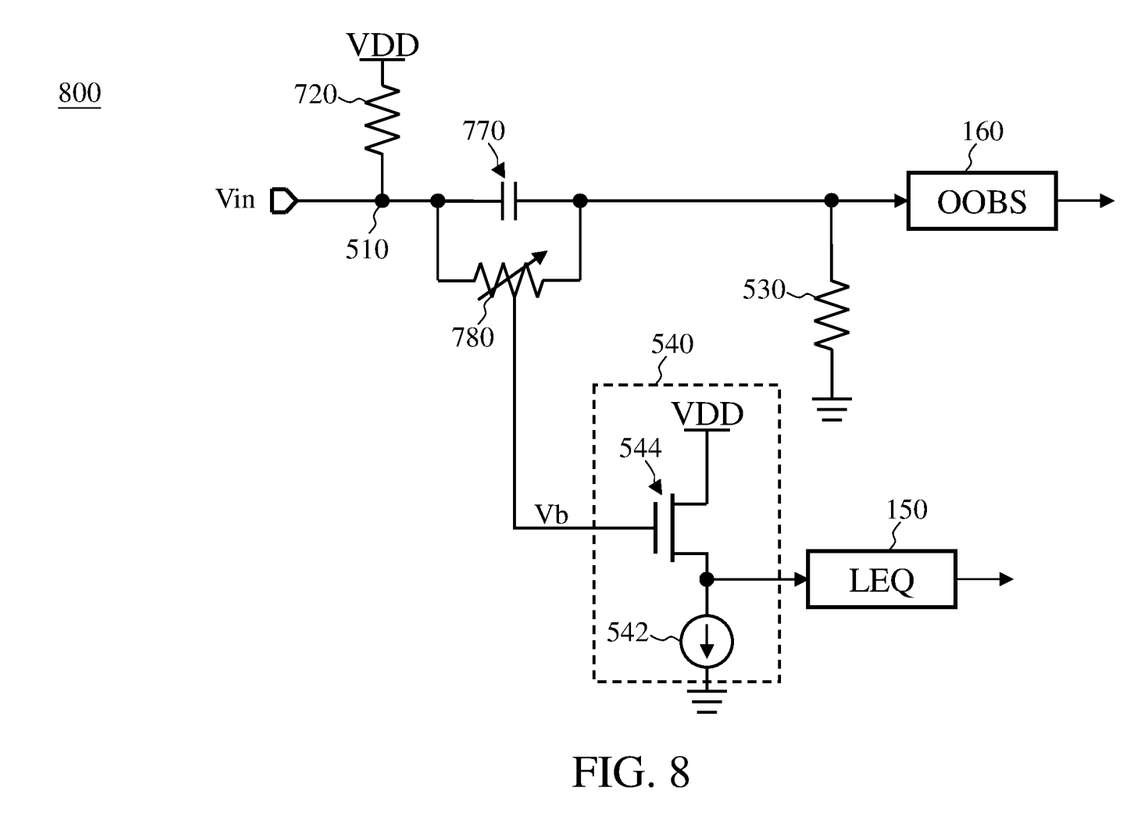
FIG. 8 is a circuit diagram of the receiving circuit of a deserializer according to another embodiment of the present invention.

FIG. 8 is a circuit diagram of the receiving circuit of the deserializer according to another embodiment of the present invention. The receiving circuit 800 is similar to the receiving circuit 700, except that the LEQ 150 and the OOBS circuit 160 are interchanged. The receiving circuit 800 is a receiving circuit of the DC coupling mode. In the embodiment of FIG. 8, the buffer circuit 540 can reduce the load observed by the LEQ 150; in addition, the common mode voltage of the LEQ 150 and the common mode voltage of the OOBS circuit 160 can be adjusted independently.

In some embodiments, the voltage Vb is greater than the voltage at the input terminal of the OOBS circuit 160.

Figure 9:
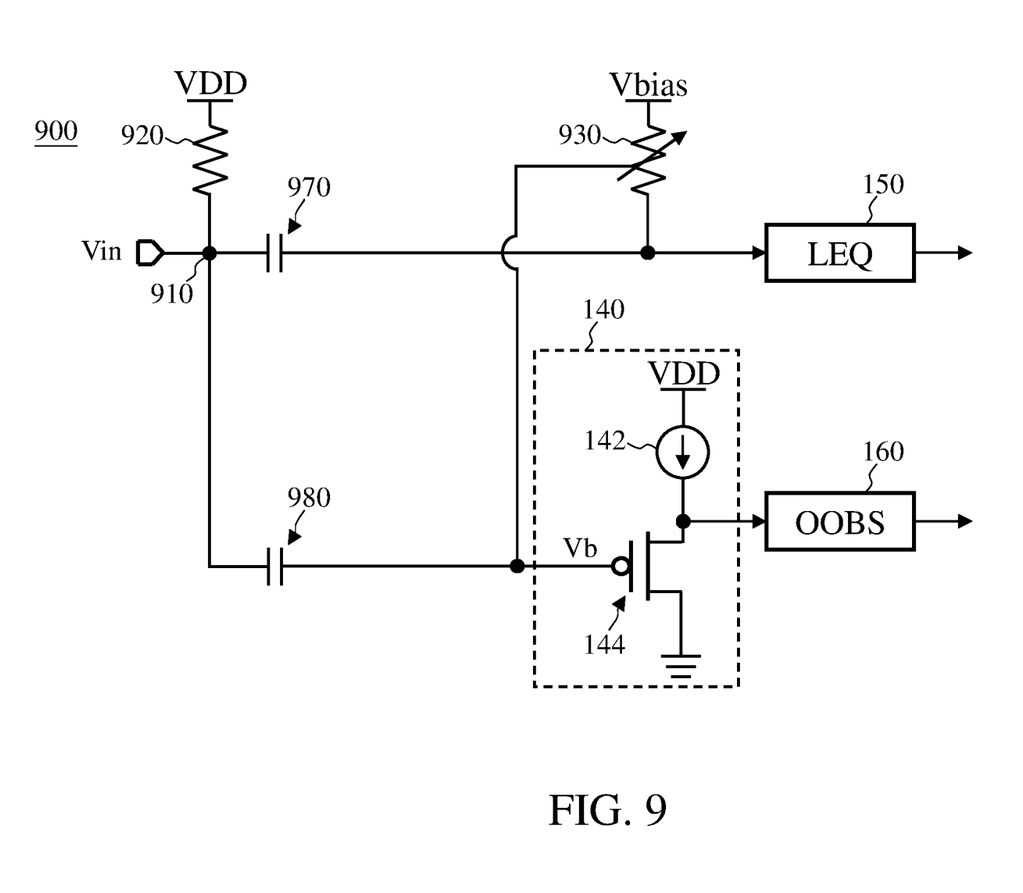
FIG. 9 is a circuit diagram of the receiving circuit of a deserializer according to another embodiment of the present invention.

FIG. 9 is a circuit diagram of the receiving circuit of the deserializer according to another embodiment of the present invention. The receiving circuit 900 includes a signal receiving terminal 910, a resistor 920, a resistor 930, the buffer circuit 140, a capacitor 970, a capacitor 980, the LEQ 150, and the OOBS circuit 160. The receiving circuit 900 is a receiving circuit of the alternating current (AC) coupling mode.

The input signal Vin is inputted into the receiving circuit 900 through the signal receiving terminal 910 (i.e., the signal receiving terminal 910 receives the input signal Vin). The resistor 920 is coupled between the first reference voltage and the signal receiving terminal 910. The resistor 930 is a variable resistor, and is coupled between the input terminal of the LEQ 150 and the bias voltage Vbias. The capacitor 970 is coupled between the signal receiving terminal 910 and the LEQ 150; more specifically, one end of the capacitor 970 is electrically connected to the signal receiving terminal 910, and the other end of the capacitor 970 is electrically connected to the LEQ 150 and the resistor 930. The capacitor 980 is coupled between the signal receiving terminal 910 and the buffer circuit 140; more specifically, one end of the capacitor 980 is electrically connected to the signal receiving terminal 910, and the other end of the capacitor 980 is electrically connected to the input terminal of the buffer circuit 140. The bias voltage Vbias can be a divided voltage of the power supply voltage VDD. The buffer circuit 140 is coupled between the resistor 930 and the OOBS circuit 160; more specifically, the input terminal of the buffer circuit 140 is electrically connected to the resistor 930, and the output terminal of the buffer circuit 140 is electrically connected to the input terminal of the OOBS circuit 160.

The input terminal of the buffer circuit 140 receives the voltage Vb which is the divided voltage on the resistor 930. In other words, the voltage Vb can be changed by adjusting the resistance of the resistor 930. Adjusting the voltage Vb is equivalent to adjusting the common mode voltage of the OOBS circuit 160.

In some embodiments, the voltage Vb is greater than the voltage at the input terminal of the LEQ 150.

One of the purposes of the buffer circuit 140 is to separate the LEQ 150 and the OOBS circuit 160 in a way that the input terminal of the LEQ 150 and the input terminal of the OOBS circuit 160 are not electrically connected to each other. As a result, the common mode voltage of the LEQ 150 and the common mode voltage of the OOBS circuit 160 can be adjusted independently.

Another purpose of the buffer circuit 140 is to reduce the load observed by the OOBS circuit 160; therefore, the data transmission rate of the receiving circuit 100 can be improved.

Figure 10:
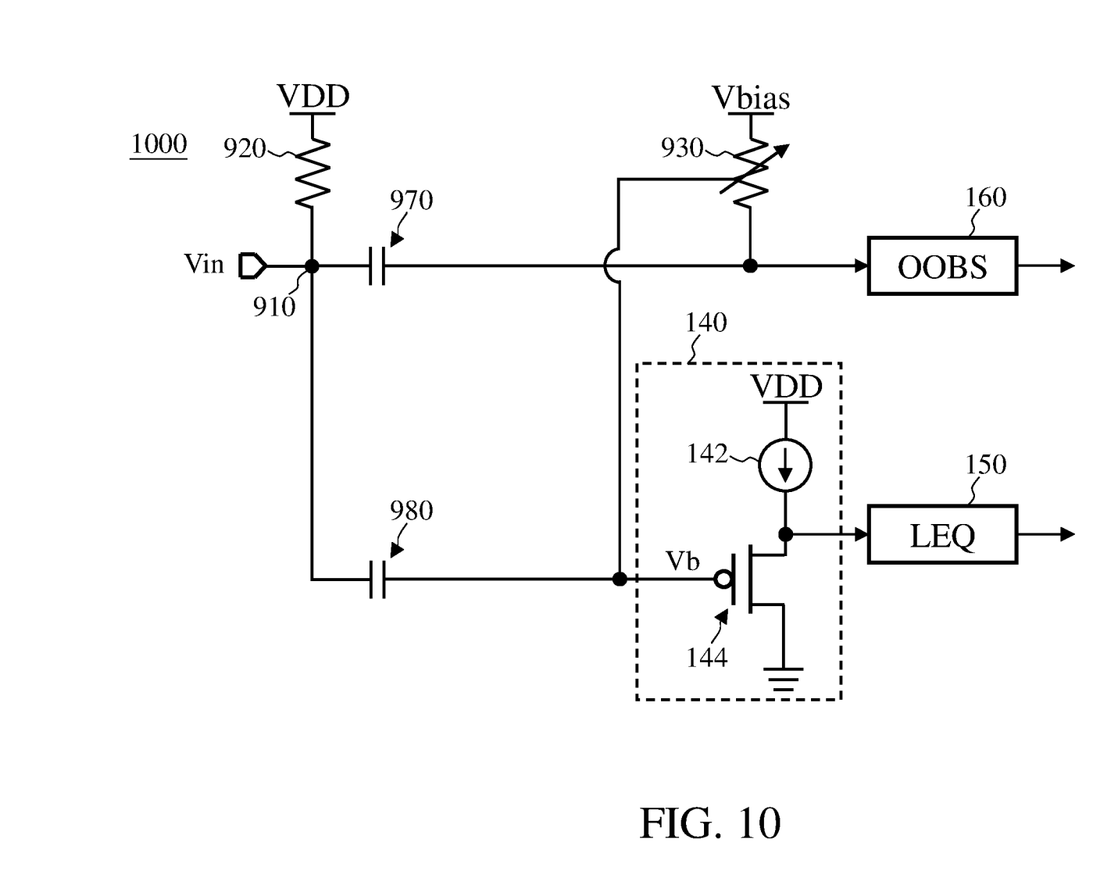
FIG. 10 is a circuit diagram of the receiving circuit of a deserializer according to another embodiment of the present invention.

FIG. 10 is a circuit diagram of the receiving circuit of the deserializer according to another embodiment of the present invention. The receiving circuit 1000 is similar to the receiving circuit 900, except that the LEQ 150 and the OOBS circuit 160 are interchanged. The receiving circuit 1000 is a receiving circuit of the AC coupling mode. In the embodiment of FIG. 10, the buffer circuit 140 can reduce the load observed by the LEQ 150; in addition, the common mode voltage of the LEQ 150 and the common mode voltage of the OOBS circuit 160 can be adjusted independently. Adjusting the voltage Vb is equivalent to adjusting the common mode voltage of the LEQ 150.

In some embodiments, the voltage Vb is greater than the voltage at the input terminal of the OOBS circuit 160.

In the embodiments discussed above the transistors are embodied by MOSFETs; however, this is for illustrative purposes only, and the present disclosure is not limited thereto. People having ordinary skill in the art know how to use the bipolar junction transistors (BJTs) to replace the MOSFETs.

The receiving circuit of the deserializer of the present invention includes a buffer circuit. One of the purposes of the buffer circuit is to separate the LEQ and the OOBS circuit in a way that the input terminals of the two components are not electrically connected. As a result, the input load of the LEQ or the OOBS circuit is reduced, and the common mode voltages of the two components can be adjusted independently. Therefore, the receiving circuit of the deserializer of the present invention does not have the load stacking issue and can thus achieve the effect of high-speed data transmission without attenuation.

The shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A receiving circuit of a deserializer, the receiving circuit receiving an input signal, comprising:
   a signal receiving terminal configured to receive the input signal;
   a link equalizer circuit having a first input terminal electrically coupled to the signal receiving terminal;
   an out-of-band signaling (OOBS) circuit having a second input terminal electrically coupled to the signal receiving terminal;
   a first resistor electrically coupled between the signal receiving terminal and a first reference voltage;
   a second resistor electrically coupled between the signal receiving terminal and a second reference voltage; and
   a buffer circuit having a third input terminal and an output terminal, wherein the third input terminal is configured to receive a voltage, and the output terminal is electrically coupled to one of the link equalizer circuit and the OOBS circuit;
   wherein the first input terminal of the link equalizer circuit and the second input terminal of the OOBS circuit are not electrically connected, and the voltage is adjustable.

2. The receiving circuit of the deserializer of claim 1, wherein the third input terminal of the buffer circuit is configured to receive from one of the first resistor and the second resistor the voltage which is a divided voltage.

3. The receiving circuit of the deserializer of claim 2, wherein the first reference voltage is greater than the second reference voltage, the third input terminal of the buffer circuit is configured to receive from the second resistor the voltage which is the divided voltage on the second resistor, and the buffer circuit is a source follower circuit.

4. The receiving circuit of the deserializer of claim 3, wherein the source follower circuit is a P-channel Metal-Oxide-Semiconductor Field-Effect Transistor source follower circuit.

5. The receiving circuit of the deserializer of claim 2, wherein the first reference voltage is greater than the second reference voltage, the third input terminal of the buffer circuit is coupled to the signal receiving terminal, the voltage is the divided voltage on the first resistor, and the buffer circuit is a source follower circuit.

6. The receiving circuit of the deserializer of claim 5, wherein the source follower circuit is an N-channel Metal-Oxide-Semiconductor Field-Effect Transistor source follower circuit.

7. The receiving circuit of the deserializer of claim 1, further comprising:
   a capacitor electrically coupled between the signal receiving terminal and one of the link equalizer circuit and the OOBS circuit; and
   a third resistor, connected in parallel with the capacitor;
   wherein the third input terminal of the buffer circuit is electrically coupled to the third resistor, and the voltage is a divided voltage on the third resistor.

8. The receiving circuit of the deserializer of claim 7, wherein the first resistor is electrically coupled to one of the link equalizer circuit and the OOBS circuit, the second resistor is electrically coupled to the signal receiving terminal, the first reference voltage is greater than the second reference voltage, and the buffer circuit is a source follower circuit.

9. The receiving circuit of the deserializer of claim 8, wherein the source follower circuit is a P-channel Metal-Oxide-Semiconductor Field-Effect Transistor source follower circuit.

10. The receiving circuit of the deserializer of claim 7, wherein the first resistor is electrically coupled to the signal receiving terminal, and the second resistor is electrically coupled to one of the link equalizer circuit and the OOBS circuit, the first reference voltage is greater than the second reference voltage, and the buffer circuit is a source follower circuit.

11. The receiving circuit of the deserializer of claim 10, wherein the source follower circuit is an N-channel Metal-Oxide-Semiconductor Field-Effect Transistor source follower circuit.

12. A receiving circuit of a deserializer, the receiving circuit receiving an input signal, comprising:
- a signal receiving terminal configured to receive the input signal;
- a link equalizer circuit having a first input terminal electrically coupled to the signal receiving terminal;
- an out-of-band signaling (OOBS) circuit having a second input terminal electrically coupled to the signal receiving terminal;
- a first capacitor having a first terminal and a second terminal, wherein the first terminal is electrically coupled to the signal receiving terminal, and the second terminal is electrically coupled to one of the link equalizer circuit and the OOBS circuit;
- a second capacitor having a third terminal and a fourth terminal, wherein the third terminal is electrically coupled to the signal receiving terminal, and the fourth terminal is electrically coupled to the one of link equalizer circuit and the OOBS circuit;
- a first resistor having a fifth terminal and a sixth terminal, wherein the fifth terminal is electrically coupled to a first reference voltage, and the sixth terminal is electrically coupled to the signal receiving terminal;
- a second resistor having a seventh terminal and an eighth terminal, wherein the seventh terminal is electrically coupled to a second reference voltage, and the eighth terminal is electrically coupled to one of the link equalizer circuit and the OOBS circuit; and
- a buffer circuit having a third input terminal and an output terminal, wherein the third input terminal is configured to receive a voltage, and the output terminal is electrically coupled to one of the link equalizer circuit and the OOBS circuit;
- wherein the first input terminal of the link equalizer circuit and the second input terminal of the OOBS circuit are not electrically coupled, and the voltage is adjustable.

13. The receiving circuit of the deserializer of claim 12, wherein the third input terminal of the buffer circuit is electrically coupled to the second resistor, the voltage is a divided voltage on the second resistor, and the buffer circuit is a source follower circuit.

14. The receiving circuit of the deserializer of claim 13, wherein the source follower circuit is a P-channel Metal-Oxide-Semiconductor Field-Effect Transistor source follower circuit.

15. The receiving circuit of the deserializer of claim 12, wherein the second terminal of the first capacitor is electrically coupled to the link equalizer circuit, and the output terminal of the buffer circuit is electrically coupled to the OOBS circuit.

16. The receiving circuit of the deserializer of claim 12, wherein the second terminal of the first capacitor is electrically coupled to the OOBS circuit, and the output terminal of the buffer circuit is electrically coupled to the link equalizer circuit.

* * * * *